United States Patent
Goudreau

(10) Patent No.: US 6,940,862 B2
(45) Date of Patent: Sep. 6, 2005

(54) APPARATUS AND METHOD FOR CLASSIFYING PACKETS

(76) Inventor: Mark Goudreau, 2 Honeyman Rd., Basking Ridge, NJ (US) 07920

( * ) Notice: Subject to any disclaimer, the term of this patent is extended or adjusted under 35 U.S.C. 154(b) by 991 days.

(21) Appl. No.: 09/888,027

(22) Filed: Jun. 25, 2001

(65) Prior Publication Data
US 2004/0213224 A1 Oct. 28, 2004

(51) Int. Cl.[7] .............................................. H04L 12/56
(52) U.S. Cl. .................................. 370/395.52; 370/466
(58) Field of Search ....................... 370/395.21, 395.42, 370/395.52, 466, 392

(56) References Cited

U.S. PATENT DOCUMENTS

| | | | | |
|---|---|---|---|---|
| 6,021,263 A | * | 2/2000 | Kujoory et al. | 709/232 |
| 6,577,642 B1 | * | 6/2003 | Fijolek et al. | 370/465 |
| 6,631,122 B1 | * | 10/2003 | Arunachalam et al. | 370/332 |
| 6,633,571 B1 | * | 10/2003 | Sakamoto et al. | 370/401 |
| 6,636,509 B1 | * | 10/2003 | Hughes | 370/389 |
| 6,650,644 B1 | * | 11/2003 | Colley et al. | 370/395.21 |
| 6,654,363 B1 | * | 11/2003 | Li et al. | 370/338 |

* cited by examiner

Primary Examiner—Kenneth Vanderpuye
(74) Attorney, Agent, or Firm—Thomas L. Adams

(57) ABSTRACT

A method and apparatus can direct packets from a first network to a second network, e.g., a backbone network. Packets of the first network follow a predetermined protocol employing global addressing. Packets of the first network have a source identification code, a destination code, and a service code. The second network offers the benefit of one of a plurality of service classes. A host (in some case in cooperation with a gateway) can (a) originate at least some of the packets and set the source identification code, the destination code, and the service code for the packets, and (b) send the packets from the host on at least one hop consistent with the destination code. An edge router can transfer the packets to the second network offering the benefit of one or more service classes. The edge router has an input device and an output device. The input device can extract from the packets the source identification code and the service code. A table stored in the edge router can use the source identification code drawn from the input device to lookup a corresponding code indicating permission with respect to the service classes. A permissible one of the service classes is allocated consistent with the service code if the service code is consistent with the corresponding code. The output device communicates with the input device and can send the packets onto the second network with the benefit of the permissible one of the service classes.

61 Claims, 7 Drawing Sheets

CLASSIFICATION FUNCTIONALITY

TCP/IP REFERENCE MODEL

IP PACKET (DATAGRAM)

| 0 | 4 | 8 | 16 | 19 | 24 | 31 |
|---|---|---|---|---|---|---|
| VERS | HLEN | TYPE SERVICE | TOTAL LENGTH ||||
| IDENTIFICATION ||| FLAGS | FRAGMENT OFFSET |||
| TIME TO LIVE || PROTOCOL | HEADER CHECKSUM ||||
| SOURCE IP ADDRESS |||||||
| DESTINATION IP ADDRESS |||||||
| IP OPTIONS (IF ANY) |||||| PADDING |
| DATA |||||||
| ……… |||||||

FIG. 3
(PRIOR ART)

APPARATUS AND METHOD FOR CLASSIFYING PACKETS

BACKGROUND OF THE INVENTION

1. Field of the Invention

The present invention relates to methods and apparatus for classifying packets that can follow an adaptive path over a communications network employing global addressing.

2. Description of Related Art

A global communications network such as the Internet can carry information for a variety of applications such as voice, video, and VPNs. Internet service providers (ISPs) need to distinguish between these different packet flows, so that each packet flow can receive its appropriate quality-of-service (QoS). These packets ought to be classified according to the bit patterns within the packet.

It is highly desirable to use protocols in such a way as to provide an appropriate QoS to current and future applications using the networks. Unfortunately, the classification problem is algorithmically difficult; that is, classification will take a relatively long time, will require expensive special-purpose hardware, or both.

In most cases, the solution to the classification problem is assumed to occur at an Internet "edge router" (i.e., at the edge of the ISP's network). However, considering the ever-increasing bandwidth requirements of Internet routers, classification seem likely to remain a speed bottleneck for many routers. Furthermore, providing classification hardware at each input line is expensive: just designing and implementing a packet classifier in hardware is expected to take well over a year even with the support of dozens of hardware and software engineers.

A conventional classification technique is to require Internet routers to examine the headers of higher-level protocols to determine the type of application. This technique, however, requires excessive coordination to maintain an appropriate QoS with ISPs, especially as users begin using new applications and new higher-level protocols. It also violates the network layering principle, which places certain functions at designated levels. Under the layering diagram of FIG. 1 the IP protocol operates at the network layer 14 (layer 3), while the TCP protocol operates at the transport layer 16 (layer 4). Higher layers are shown collapsed into session/presentation/application layer 18.

In the future, many users will require that the secrecy of their Internet traffic be maintained. This will be handled with encryption as described by the IPsec standard. Unfortunately, when encryption is used, the higher-level protocol headers are not available to intermediate routers, and correct classification is impossible with the traditional approaches. Thus, security is incompatible with QoS if packet classification occurs at the Internet backbone.

In the initial design of the Internet, there was no provision for QoS. Routers would examine the IP header of an incoming packet, extract the destination IP address, and forward the packet to the "next hop" after consulting a lookup table indexed by IP addresses. This approach of determining forwarding by consulting a fixed field within the packet has several advantages, including speed, simplicity, and modularity. However, if QoS is to be supported, routers cannot treat all packets the same just because they have the same destination IP address.

To maintain generality, references herein to IP protocols or Internet communications will be deemed to include communication techniques and protocols that exist now or may exist in the future to allow forwarding of packets to a destination by using a global addressing scheme (whether or not the network in fact has a reach that is global or very restricted) along an adaptive path, that is, a path that may change to accommodate traffic load or to circumvent networks or nodes having difficulties.

FIGS. 2 and 3 show the format of an TCP/IP packet. All IP packets contain an IP header, which will contain, among other things, a source IP address (32 bit source identification code), a destination IP address (32 bit destination code), and a protocol field (8 bits). The IP header includes a Type of Service field (TOS field, enlisted herein to carry a service code). In practice, most hosts and routers do not use the TOS field. However, this field was defined in RFC 791 [infra., Bibliography 3] to give "hints" to routers as to the kind of service the packet should receive. In that document, the 8-bit TOS field is broken up into a 3-bit precedence field (000 being normal precedence at one extreme and 111 being network control precedence at the other), 1 bit to request low delay service, 1 bit to request high throughput service, 1 bit to request high reliability service, and 2 unused bits.

As shown in FIG. 2, each IP packet has a number of fields outside the IP header that can be used for classification. Field matching may be based on specific (distinct) values, ranges of values, or prefixes. It is possible to examine any portion of an IP packet for the purposes of classification. In practice, it is probably only the first few headers that will be considered for this purpose.

Traditionally, all these fields will typically be used for packet classification, in combination with the data portion of an IP packet. This data portion may contain a TCP segment, as shown in FIG. 4. In this case, it is likely the classifying mechanism will consider the TCP source port (16 bits) and the TCP destination port (16 bits). Higher-layer (or application-layer) headers can also be used for classification purposes. In general, it does not matter which protocols are using IP. If the classifier understands the protocols in use, classification based on header fields is possible.

Unfortunately, the classification technique just described makes prohibitive demands on resources in the general case. Assuming a set of n objects (corresponding to packet flow classes) in d dimensions (corresponding to fields in the packet used for classification), the best known algorithms run in either $O(\log^{d-1} n)$ time with $O(n)$ space, or $O(\log n)$ time with $O(n^d)$ space. In other words, either exponential time or space (relative to the dimension of the classification) will be needed. See M. H. Overmars and A. F. van der Stappen, "Range Searching and Point Location among Fat Objects," *Journal of Algorithms*, vol. 21, no. 3, pp. 629–656, 1996.

To take a more practical view, n may grow large in real systems, but the size of d is likely to be quite limited. For example, the literature describes packet-filtering gateways—a similar application—as using source and destination IP addresses, the protocol field in the IP header, the source and destination TCP (or UDP) ports, and TCP (or UDP) flags. See W. R. Cheswick and S. M. Bellovin, *Firewalls and Internet Security: Repelling the Wily Hacker*, Addison-Wesley, Reading, Mass., 1994.

Typically, classification is assumed to occur at the "edge router" (i.e., at the edge of the ISP's network or other domain boundary). A conventional approach to packet classification assumes that routers between an enterprise network and a core backbone network are performing the classification. For example, the packet classification approaches described by Srinivasan et al. [Bibliography 9, 10], Lakshman and Stiliadis [Bibliography 8], and Gupta and McKeown [Bibliography 11] all assume such an environment. However, even for moderate sizes of d, packet classification at wire speeds of OC-48 (2.4 Gbps) or OC-192 (10 Gbps) is likely to be a difficult and expensive proposition. If implemented in software, packet classification will almost certainly be a bottleneck limiting line throughput. If implemented in hardware, classification will be very expensive and inflexible, and it can easily remain a bottleneck.

To deal with QoS issues the Diffserv standard was introduced, as described in RFC 2474. With Diffserv the TOS field (Type of Service field of FIG. 3) is redefined to specify use in a way distinct from the earlier IPv4 and IPv6 standards. See, K. Nichols, S. Blake, F. Baker, and D. Black, "Definition of the Differentiated Services Field (DS Field) in the IPv4 and IPv6 Headers," RFC 2474, December 1998. With Diffserv, the TOS field is renamed the Differentiated Services Field (DS Field). Six bits are used to indicate the Differentiated Services Codepoint (DSCP), and two bits are unused. The Diffserv standard contemplates use with a range of queue service and/or queue management disciplines inside a "DS domain boundary." It is still up to routers at the edge of this DS domain boundary to ensure that all traffic entering the domain is marked with codepoint values appropriate to the traffic and the domain, remarking the traffic with new codepoint values if necessary. Therefore, the Diffserv standard does not solve the problems of transferring data across overloaded edge routers. Moreover, the Diffserv standard assumes replacement of the IPv4 and IPv6 standards for networks that will support QoS. This may require a large capital investment to replace routers operating inside a DS domain boundary.

In U.S. Pat. No. 6,046,979 layer 3 and 4 header information from the TCP/IP protocols are stored in a linked memory index using an ASIC. The user can specify a bandwidth based upon the application (HTTP, FTP, etc.) and based upon the source and the destination of packets. The system uses a credit bucket approach to regulate the bandwidth for a particular flow. This approach requires culling out high-level application information and will be relatively complex and slow, as noted above.

In U.S. Pat. No. 6,046,980 traffic flows can be classified based on the type of service (FTP, Web, etc.), the type of data object (*.gif, *.avi, etc.), the class of users (a department in an enterprise), or a TCP data rate detected by an autobaud component. Based on the classification, a specific flow can be given a preferred or guaranteed bandwidth. Again, this reference works on a relatively high level and will be relatively complex and slow.

For other references working above level 3, see U.S. Pat. No. 6,018,530 (TCP header is modified to (a) use a generally unused, reserved section, and (b) insert specialized information into certain option fields); and U.S. Pat. No. 5,506,834 (LAN interface examines identifying information existing at the application level, such as the FTP control frame);

ATM is a standard protocol for transmitting asynchronous telecommunications data. This protocol is based on the transmission of data in fixed size data packets known as ATM cells. The ATM protocol is connection oriented. Specifically, an ATM network will establish at the outset a path through the network that persists so long as the connection lasts. While the ATM protocol offers quality of service features that let customers prioritize certain types of traffic, granting a level of service can be difficult when packets from different sources arrive sporadically, as is the case with ordinary Internet traffic. Much work has been done to allow transmission of IP packets over an ATM network, but these approaches have not satisfactorily solved the task of efficiently handling quality of service requests at the edge router.

For various approaches to handling quality of service issues for an ATM network, see U.S. Pat. No. 6,041,039 (Generic Flow Control field in the ATM header may be set by the sender to designate the cell priority level and whether the service is to be real-time); U.S. Pat. No. 6,041,054 (enhance bandwidth for IP packets using ATM adaption layer 2 (AAL2) by sending an address to a lookup table in place of repetitive portions of the header); U.S. Pat. No. 6,049,544 (a voice server module in an ATM switch examines flag bits indicating data compression, facsimile tone detection, silence, etc.); and U.S. Pat. No. 6,178,169 (ATM cells are given a header with source and destination information before being sent in a connectionless manner).

See also U.S. Pat. No. 6,044,081 (signaling information is sent separately over a non-isochronous packet network to support isochronous communications); U.S. Pat. No. 5,999,518 (data packet routed based on list of addresses at packet switch, otherwise handed off to next switch); and U.S. Pat. No. 5,694,548.

Bibliographic References

[1] M. H. Overmars and A. F. van der Stappen, "Range Searching and Point Location among Fat Objects," *Journal of Algorithms*, vol. 21, no. 3, pp. 629–656, 1996.

[2] W. R. Cheswick and S. M. Bellovin, *Firewalls and Internet Security: Repelling the Wily Hacker*, Addison-Wesley, Reading, Mass., 1994.

[3] J. Postel, Editor, "Internet Protocol," STD 5, RFC 791, September 1981.

[4] K. Nichols, S. Blake, F. Baker, and D. Black, "Definition of the Differentiated Services Field (DS Field) in the IPv4 and IPv6 Headers," RFC 2474, December 1998.

[5] E. C. Rosen, Y. Rekhter, D. Tappan, D. Farinacci, G. Fedorkow, T. Li, and A. Conta, "MPLS Label Stack Encoding," Work in Progress, September 1999.

[6] F. Baker, Editor, "Requirements for IP Version 4 Routers," RFC 1812, June 1995.

[7] D. E. Knuth, *The Art of Computer Programming, Volume 3, Sorting and Searching*," second edition, Addison-Wesley, Reading, Mass., 1998.

[8] T. V. Lakshman and D. Stiliadis, "High-speed Policy-based Packet Forwarding Using Efficient Multi-dimensional Range Matching," in *SIGCOMM'98*, Vancouver, BC, October 1998.

[9] V. Srinivasan, G. Varghese, S. Suri, and M. Waldvogel, "Fast and Scalable Layer Four Switching," in *SIGCOMM'98*, Vancouver, BC, October 1998.

[10] M. Degermark, A. Brodnik, S. Carlsson, and S. Pink, "Small Forwarding Tables for Fast Routing Lookups," in *SIGCOMM'97*, Cannes, France, 1997.

[11] M. Waldvogel, G. Varghese, J. Turner, and B. Plattner, "Scalable High Speed IP Routing Lookups," in *SIGCOMM'97*, Cannes, France, 1997.

[12] P. Gupta, S. Lin, and N. McKeown, "Routing Lookups in Hardware at Memory Access Speeds," in *INFOCOM'98*, San Francisco, Calif., April 1998.

[13] B. Lampson, V. Srinivasan, and G. Varghese, "IP Lookups Using Multiway and Multicolumn Search," in *INFOCOM'98*, San Francisco, Calif., April 1998.

[14] T.-C. Church and P. Pradhan, "High Performance IP Routing Table Lookup Using CPU Caching," in *INFOCOM'99*, New York, N.Y., 1999.

[15] N.-F. Huang, S.-M. Zhao, J.-Y. Pan, and C.-A. Su, "A Fast IP Routing Lookup Scheme for Gigabit Switching Routers," in *INFOCOM'99*, New York, N.Y., 1999.

[16] G. Cheung and S. McCanne, "Optimal Routing Table Design for IP Address Lookups under Memory Constraints," in *INFOCOM'99*, New York, N.Y., 1999.

SUMMARY OF THE INVENTION

In accordance with the illustrative embodiments demonstrating features and advantages of the present invention, there is provided a method for directing packets from a first network to a second network. Packets of the first network follow a predetermined protocol employing global addressing. Packets of the first network have a source identification code, a destination code, and a service code. The second network offers the benefit of one of a plurality of service classes. The method includes the step of extracting the source identification code and the service code from packets of the first network. Another step is using the source identification code to lookup a corresponding code indicating permission with respect to the service classes. The method also includes the step of issuing packets onto the second network with the benefit of a permissible one of the service classes. The permissible one of the service classes is allocated consistent with the service code if the service code is consistent with the corresponding code.

According to another aspect of the invention, apparatus is provided for directing packets from the above first network to the above second network. Packets of the first network follow the above protocol and codes. The apparatus includes an input device and an output device. The input device is adapted to be coupled to the first network for extracting from packets the source identification code and the service code. The apparatus also includes a table coupled to the input device for using the source identification code to lookup a corresponding code indicating permission with respect to the service classes. A permissible one of the service classes is allocated consistent with the service code if the service code is consistent with the corresponding code. The output device is adapted to be coupled to the second network. The input device is in communication with the input device for issuing packets with the benefit of the permissible one of the service classes.

According to still another aspect of the invention, apparatus is provided for directing packets from the above first network to the above second network. Packets of the first network follow the above protocol and codes. The apparatus includes a host for (a) originating at least some of the packets and setting the source identification code, the destination code, and the service code for the packets, and (b) sending the packets from the host on at least one hop over the first network consistent with the destination code. Also included is an edge router for receiving packets over the first network from the host and for transferring the packets to the second network using different ones of the service classes. The edge router has an input device and an output device. The input device is adapted to be connected to the first network for extracting from packets the source identification code and the service code. The edge router also has a table coupled to the input device for using the source identification code to lookup a corresponding code indicating permission with respect to the service classes. A permissible one of the service classes is allocated consistent with the service code if the service code is consistent with the corresponding code. The output device is adapted to be connected to the second network. The output device is in communication with the input device for sending packets onto the second network with the benefit of the permissible one of the service classes.

According to yet another aspect of the invention, apparatus is provided for directing packets from the above first network to the above second network. Packets of the first network follow the above protocol and codes. The apparatus includes a host for (a) originating at least some of the packets and setting the source identification code, and the destination code for the packets, and (b) sending the packets from the host on at least one hop over the first network consistent with the destination code. Also included is a gateway coupled to the host over the first network for (a) setting the service code for the packets produced by the host, and (b) sending the packets reaching the gateway from the host on at least one hop over the first network consistent with the destination code. The apparatus also includes an edge router coupled to the gateway over the first network for transferring packets to the second network. The edge router has an input device and an output device. The input device is adapted to be coupled to the first network for extracting from packets the source identification code and the service code. The edge router also has a table coupled to the input device for using the source identification code to lookup a corresponding code indicating permission with respect to the service classes. A permissible one of the service classes is allocated consistent with the service code if the service code is consistent with the corresponding code. The output device is adapted to be coupled to the second network. The output device is in communication with the input device for issuing packets with the benefit of the permissible one of the service classes.

According to still yet another aspect of the invention, apparatus is provided for directing from a first network packets following a predetermined protocol employing global addressing. Packets of the first network have a source identification code, a destination code, and a service code. The apparatus includes a second network offering the benefit of one or more service classes. Also included is an edge router for transferring packets to the second network using different ones of service classes. The edge router has an input device and an output device. The input device is adapted to be connected to the first network for extracting from packets the source identification code and the service code. The edge router also has a table coupled to the input device for using the source identification code to lookup a corresponding code indicating permission with respect to the service classes. A permissible one of the service classes is allocated consistent with the service code if the service code is consistent with the corresponding code. The output device is adapted to be connected to the second network. The output device is in communication with the input device for sending packets onto the second network with the benefit of the permissible one of the service classes.

According to a further aspect of the invention, a method is provided for directing packets from a first network to a second network. Packets of the first network follow a predetermined protocol employing global addressing. Packets of the first network have a source identification code, a destination code, and a service code. The second network offers the benefit of one of a plurality of service classes. The method includes the step of extracting the destination code and the service code from packets of the first network. Another step is using the destination code to lookup a corresponding code indicating permission with respect to the service classes. The method also includes the step of issuing packets onto the second network with the benefit of a permissible one of the service classes. The permissible one of the service classes is allocated consistent with the service code if the service code is consistent with the corresponding code.

For the preferred architecture described herein, the initial designation of a packet's classification is performed at the source or host computer (typically with software) rather than at the edge router (typically with hardware). The job of the preferred edge router is simplified: it simply checks if the packet was legally classified, based on the source IP address of the packet.

Many advantages follow from this approach. The computationally difficult packet classification problem is moved from the heavily utilized router to the lightly utilized source, removing a bottleneck from the Internet backbone. By pushing classification to the source, both QoS and security can be supported. The processing power of desktop computers is typically very lightly utilized. This implies that the classification problem can reasonably be handled in software at the source computer, rather than in hardware at the edge router. The source computer should be able to easily handle classification for its own packets using software that will, in effect, be part of the operating system. This shift as to where classification occurs is important, since one will move it from a heavily utilized resource (the edge router) to a lightly utilized resource (the source computer).

In a preferred embodiment the ISP and the source computer (or source network) agree on which classes of traffic the source may use. The source computer (or source network) classifies all outgoing packets accordingly, preferably by setting the TOS field in the IP header. When the packet arrives at the edge router of the ISP network, the edge router finds the longest-matching prefix (LMP) of the source IP address to determine if the packet has been classified in a legal manner. If the packet has not been classified in a legal manner, the TOS field is set to the lowest priority (a defaulting one of the quality of service classes), and the packet is forwarded. (In many cases, this will mean the packet is forwarded as a regular IP packet, i.e. with no QoS.) If the packet has been classified in a legal manner, the TOS field is used to determine the way the packet is forwarded.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 3 is an IP packet datagram;

DETAILED DESCRIPTION OF THE PREFERRED EMBODIMENTS

Figure 5:
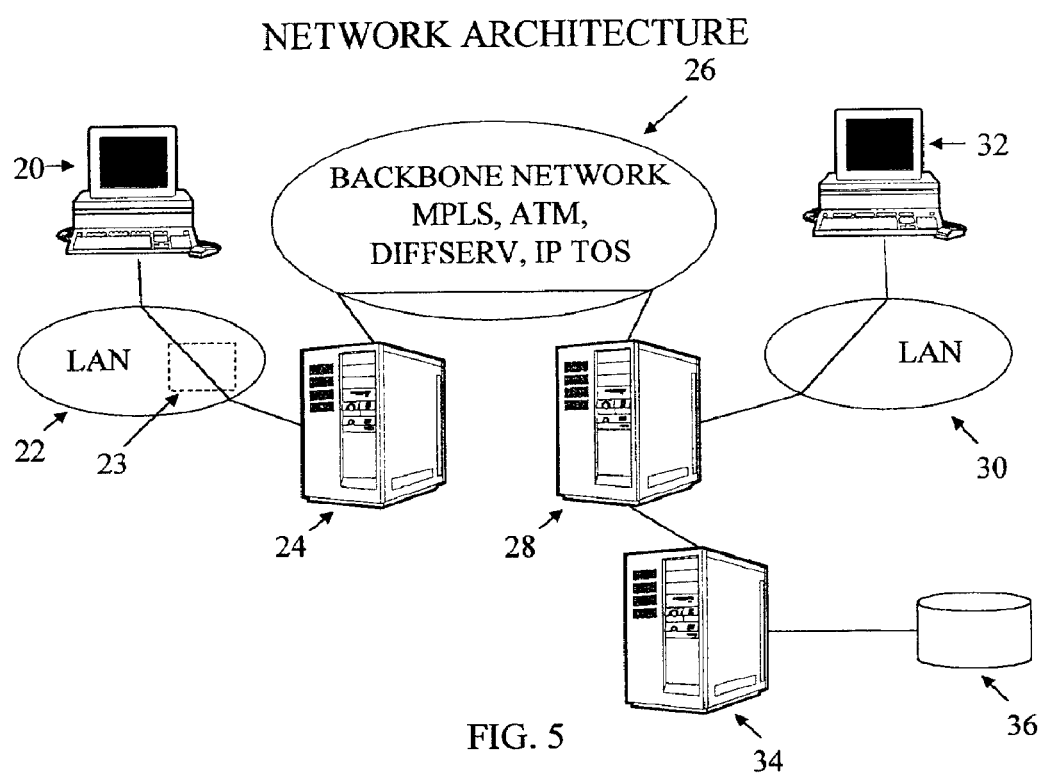
FIG. 5 is a schematic diagram of a network system employing edge routers operating in accordance with principles of the present invention.

Referring to FIG. 5, a generalized system is shown having a host computer 20 connected to a local area network (LAN) 22. Network 22 may be used by a small group or may be elaborated into a wide area network (WAN) for a larger enterprise. Network 22 may have a number of bridges or routers that connect to other networks in a known manner. Network 22 may also have a number of servers (not shown) operating as file servers, database servers intranet servers, etc.

Network 22 is shown connecting to edge router 24. In some embodiments, edge router 24 may be part of network 22 and therefore be maintained and operated by the same local administrator. In other embodiments, edge router 24 will be operated by an independent ISP (Internet service provider) or by another provider that is offering a PN (private network) that may or may not communicate over the Internet.

Where the edge router 24 is operated by an independent third party, network 22 will typically contain a gateway router 23 (shown in phantom) that connects to edge router 24. Gateway 23 may simply examine the source destination code of packets and route those packets that are destined to a location outside network 22 to edge router 24. As explained further hereinafter, gateway 23 may in other embodiments set the Type of Service field (FIG. 3) in order to establish communications under a particular quality of service class.

Edge router 24 is shown connecting to a backbone network 26 (also referred to as a second network). Backbone 26 may be a high-speed network maintained by a regional or national ISP; or may simply be a privately owned, dedicated network. Backbone 26 need not be part of the Internet, although in the preferred embodiment the communications will still use the same protocols as are used for the Internet (or in any other similar type of communications network employing global addressing). In some embodiments, backbone 26 may be a vBNS (very high speed backbone network service), NAP (network access point), NSP (network service provider), MAE (metropolitan area exchanges), LAP (local access point), or CIX (commercial Internet exchange). Backbone 26 may also be operated, without granting access to the general public, by a governmental agency for governmental purposes, or by a particular industry or trade group (for example, by the banking industry). It is assumed however, that backbone 26 provides different service classes each offering its own quality of service.

Backbone 26 may use any one of a variety of protocols such as MPLS, ATM, Diffserv, IP TOS, etc. Also, backbone 26 is not necessarily a single network with a single protocol domain, but may actually consist of a number of networks having different protocol domains. Furthermore, the paths taken through these different domains may be adaptive in the sense that alternative routes may be established from time to time to accommodate traffic loads or to avoid networks or nodes that are having difficulties.

Two paths are shown between edge router 24 and backbone 26 (one in full, one in phantom). These alternate paths suggest that edge router 24 has the ability (a) to route packets to different backbones having different protocol domains; or (b) to establish different channels as may be possible with certain protocols. (The illustration of two alternate paths does not imply that only two alternatives are contemplated, but in some instances only one path or more than two paths may be offered.) In this specification this ability to effectuate such alternates is referred to as using different "access nodes."

Edge router 24 may serve different types of arrangements. For example, a local area network will not be found in every instance, and in some embodiments the edge router 24 may serve only a single host computer or only one server or a bank of servers. In other embodiments an ISP or other entity may intervene between the edge router 24 and the user (user herein referring to a local area network, host computer, a server, or the like). The latter architecture suggests delegating to a router higher in the architecture the task of approving a requested quality of service, in a manner explained further hereinafter Packets routed into backbone 26 by edge router 24 make one or more hops, eventually reaching another edge router 28. Router 28 is shown with a connection to local area network 30, which may be similar to previously mentioned network 22. Network 30 is shown connecting to a host computer 32, although it will be appreciated that many such hosts may be in the network and the network may have a variety of servers (file servers, database servers, etc.).

Router 28 is also shown having a connection to a web server 34. Server 34 may provide a variety of services (http, FTP, email, etc.) privately or to the public by delivering information held in mass storage 36. In some embodiments edge router 28 will connect to a much different arrangement.

In the preferred embodiment of the packet classification architecture, the setting of packet classification occurs through software at the host computer 20. The classification software may function as part of the host's operating system. Any one of a variety of packet classification algorithms can be used at the source computer. System administrators will be able to setup an appropriate classification table. In addition, users will be able to classify their traffic at a high level, for example, at the application level.

Host computer 20 (or network 22) may use any one of a number of methods to decide which packets should receive which QoS. In some instances a host application (for example, videoconferencing, streaming audio, etc.) may open a socket and related services to encapsulate an IP packet and to set the TOS field (Type of Service field of FIG. 3) at a predetermined value without intervention by the user. Alternatively, the application may provide a user interface to allow the user to specify a QoS that is then encoded into the TOS field. In other cases, the operating system of the source computer 20 may have a simple interface to set a QoS request that is to be subsequently considered by the edge router. Some operating systems may have an automated feature that varies the QoS depending upon the type of data. Alternatively, an ISP can provide a screen at sign on that allows the user to select a QoS.

Figure 1:
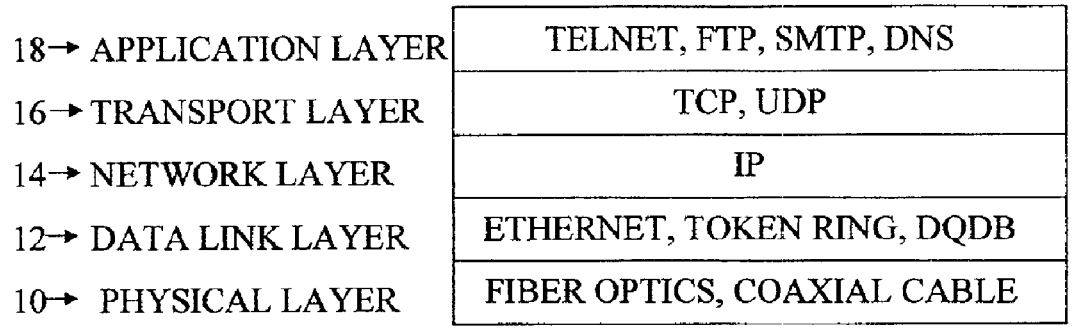
FIG. 1 is a diagram of the OSI layering scheme as known in the prior art.
Figure 2:
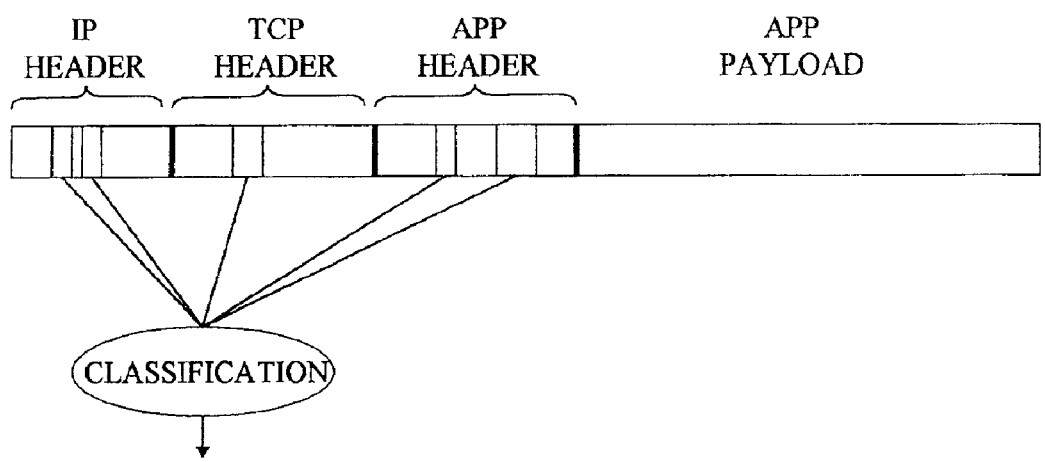
FIG. 2 is a diagram of an IP packet including the IP header and other encapsulated headers.
Figure 4:
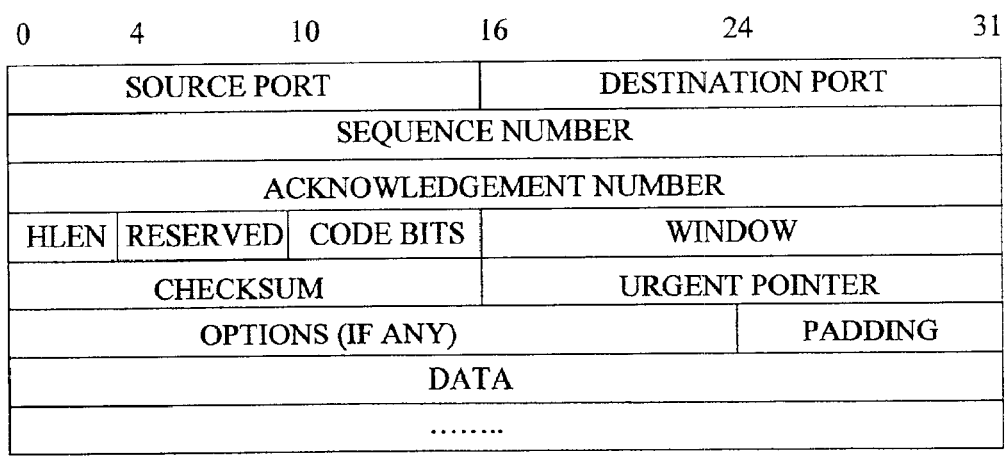
FIG. 4 is a diagram of a TCP segment.

The packet classification technique used at the source computer 20 may be of any variety. It may be implemented in either software or even in hardware. The hardware implementations may use established techniques for examining information above the network layer (i.e., above layer 14 of FIG. 1) to determine the type of application or the class of data being forwarded, in which case the classification can occur transparently without user intervention. In any event, there are a wide range of algorithms that can be used for this purpose. Moreover, setting the QoS request need not be limited to the TOS field. In some embodiments the QoS request may be encoded in the IP Options field. For non-IP protocols still other variations are possible.

In still other embodiments, the classification will not occur at host computer 20. Instead, network 22 will have a gateway 23 that will perform the classification. Gateway 23 may perform in a fashion similar to that described for instances where host computer 20 does the classification. In other cases, gateway 23 may discriminate between different host computers and accord a privileged service classification to hosts that are members of a specific group; such as a department, building, employee class, etc. In still other instances, gateway 23 may simply afford the same service classification to all traffic.

At the edge router 24, a source identification code in each packet (e.g., source IP address of FIG. 3) is used to evaluate the classification of the packet. (The edge router 24 also has the option of keeping statistics for each classified flow, for the purposes of network management or billing.) A standard IP lookup (e.g., an LMP calculation based on the source address) can occur in edge router 24, either in software or with application-specific hardware (ASIC) to perform the classification.

In some embodiments edge router 24 will not perform such classification evaluation, but will allow the evaluation to be performed by routers that are downstream. This implies that the user has a relationship not only with the operator of edge router 24 but with this downstream router. In this case, edge router 24 will simply forward all packets with a consistent quality of service or use some other scheme that is acceptable to the parties.

Wherever the classification occurs, any one of a variety of IP lookup algorithms can be used at the edge router 24 or elsewhere. This lookup can obtain a corresponding permission code indicating the class or classes of service that this packet is entitled to demand. The edge router 24 also examines a service code in the packet (e.g., the Type of Service field of FIG. 3) to determine the class of service being requested and if this request is "legal", that is, consistent with the permission code obtained during the classification lookup. In some embodiments, however, only two levels of service will be available: a high quality of service, or a default level. In such a case, a router need not examine the permission code, but will simply need to verify that the source identification code is on an approved list.

The foregoing shifted functionality away from the edge router 24. In the conventional approach, the edge router performs a general packet classification that examines information above the network layer (above layer 14 of FIG. 1), which task tends to restrict bandwidth, etc. In contrast, the present system prescribes an LMP calculation by the edge router 24 in the network layer, which is akin to the calculations already performed at such edge routers. The LMP problem is well-understood and router 24 may employ any one of a number of approaches based on standard search techniques; many based on the trie data structure. For an overview of potential search techniques, see the Bibliography, Knuth [7]. For LMP approaches tuned to IP forwarding, see examples included in the Bibliography [10, 11, 12, 13, 14, 15, 16].

The longest-prefix match algorithm used at edge router 24 may be of any of these varieties. It may be implemented in either software or hardware, and there are a wide range of algorithms that can be used in any event. Once the LMP is found, the TOS field may be used to index the data structure in any manner. The router may, for example, use direct mapping, or a linked list.

Figure 6:
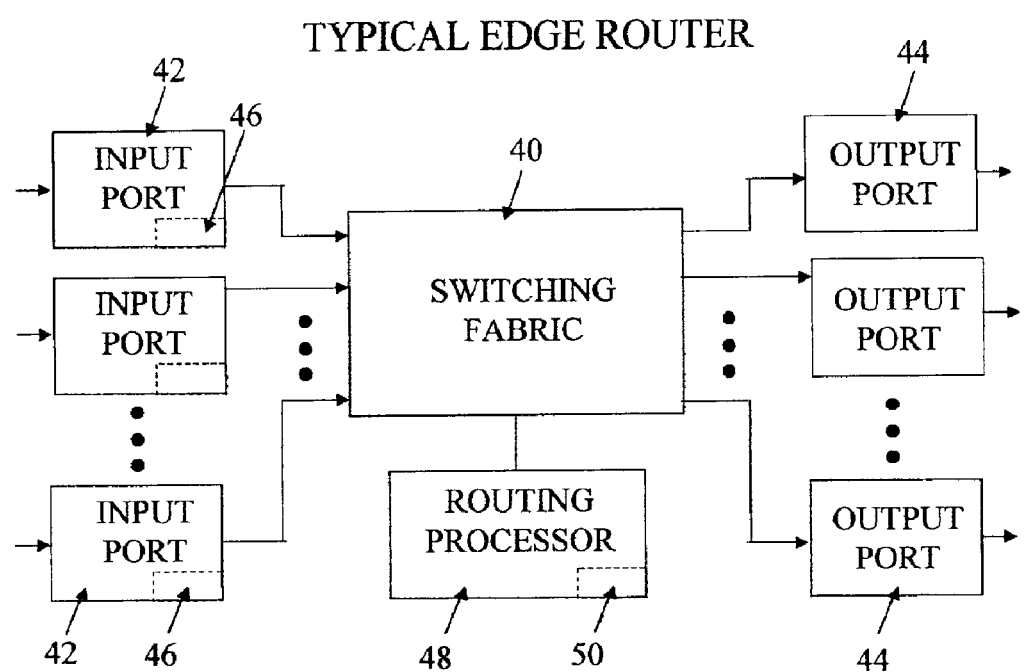
FIG. 6 is a block diagram of the edge router of FIG. 5.

Referring to FIG. 6, a block diagram of a typical edge router is shown with a switching fabric 40 connected between input devices 42 and output devices 44. The devices 42 may receive packets or frames that can encapsulate an underlying packet arranged under a protocols such as IP. This encapsulation may be undone to reassemble the underlying packet in order to examine its header. This will enable the device to examine the source identification code, destination code, and service code that may be associated with the underlying packet (see FIG. 3).

Devices 42 act as input ports and each has a routing table 46. As explained further hereinafter, tables 46 include a QoS table to determine whether packets encoded to request a specific class of service will be granted their request. Accordingly, the input ports 42 will determine an appropriate output port 44 depending upon whether the QoS request is granted. The packets thus processed by ports 42 will be immediately transmitted through switching fabric 40, unless the volume of traffic does not permit, in which case packets may be queued for later transmission. Upon arrival at output ports 44, the packets will be encapsulated if needed and will then either be immediately forwarded or queued for later forwarding.

A routing processor 48 is shown coupled to the switching fabric 40. Processor 48 may receive routing information from other networks (not shown) which will be used to update routing table 50. The details of this updated routing table 50 will be communicated to input ports 42 so they can update their routing tables 46. Processor 48 can also perform a variety of administrative tasks and other functions normally associated with such processors.

Figure 7:
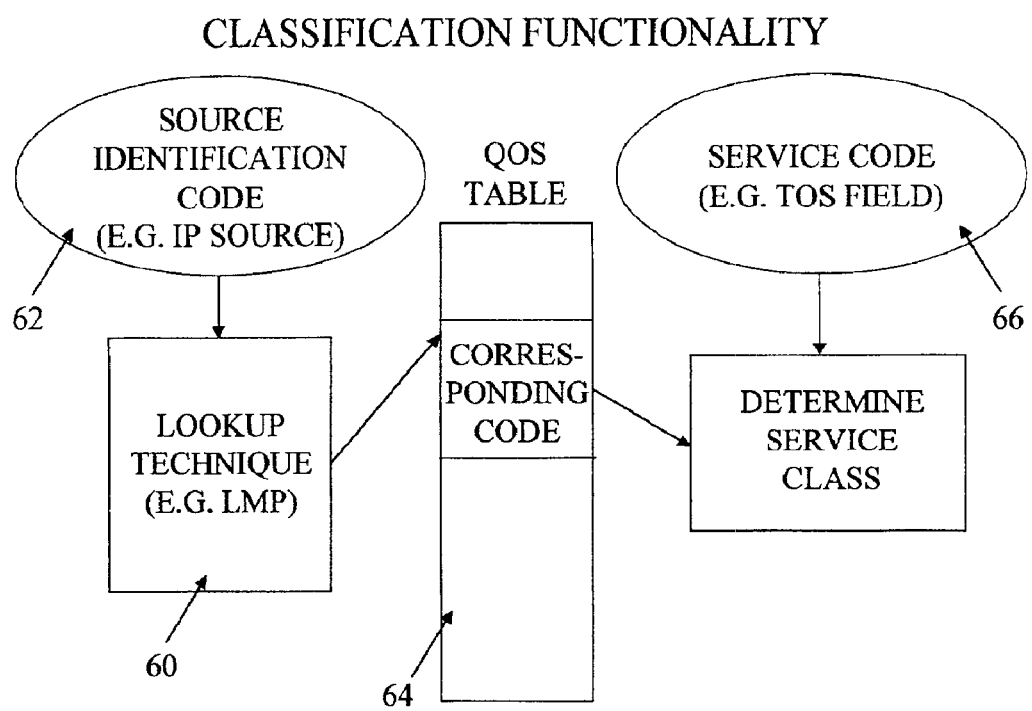
FIG. 7 is a schematic diagram indicating the operation of the service table of the router of FIG. 6.

FIG. 7 shows an aspect of the functionality of the foregoing router in more detail. When a packet arrives at an input port, the edge router performs a longest-matching prefix (LMP) operation 60 on the source IP address 62. The LMP calculation is a standard part of current IP forwarding, though for IP forwarding the LMP is applied to the destination IP address, as defined in RFC 1812. Unlike the traditional packet classification problem, there are numerous hardware and software techniques to perform LMP calculation 60 quickly and efficiently.

The LMP calculation 60 will provide a pointer into a data structure called the QoS table 64 (also referred to as a service table). For each prefix, the QoS table 64 contains all the relevant information about how packets from this source may be classified. The relevant part of the QoS table 64 is searched to see if the incoming TOS (Type of Service, FIG. 3) 66 is legal. The edge router may also update statistics for this given pair (source IP address, TOS).

Any one a variety of methods can be employed to define the TOS mapping performed by service table 64. The significance of a bit pattern in the TOS field (FIG. 3) can be either an industry wide standard or can be tailored to the needs of a particular ISP or enterprise. The eight bits in the TOS field can have arbitrary semantics defined by an ISP. It is also possible to use the TOS field in strict conformance to the IP standard or the Diffserv standard. If the ISP supports either IP TOS or Diffserv, the system can be used to verify classifications and tally statistics.

It is possible that edge router 24 (FIG. 5) will use the TOS bits to indicate the correct MPLS or ATM path. Or any other use of the bits is possible. Various other techniques are contemplated for automatic setup over the Internet through manual configuration.

For backbones that support MPLS, it would have been desirable if the source computer could have the ability of indicating the desired MPLS path in the TOS field. Unfortunately, the eight bits of the TOS field will not be sufficient to store the 20 bits used by an MPLS label. However, after finding the longest-matching prefix for the source IP address, the edge router 24 can use the TOS field to find the correct MPLS label. In other words, the combination of the longest matching prefix and the TOS field will correspond to a particular MPLS label.

In some embodiments, approval of a requested class of service may be performed outside of a router. For example, the TOS field may initially be used by a router, not to approve a requested quality of service, but to route packets to a corresponding classifying device that has such authority. This classifying device would have only two options: grant a predetermined quality of service, or grant a default quality of service. Therefore, this device need only determine whether the sender is on an approved list and need not examine a permission code that indicates the authorized quality of service.

These service classes may be characterized by an ability to offer one or more desirable qualities or traits. For example a service class may be distinguished by a specified bandwidth, latency, jitter, reliability, security, or by some specified combination of them. A service class may be entitled to a quality of service that is guaranteed or that varies with circumstances (best service possible in light of traffic; best service available after serving higher priority classes; fair share of bandwidth allocated to the class, etc.). A service class may also be distinguished by designating a specific path through an ATM or MPLS network. A service class may also designate a desired backbone type (ATM, MPLS, etc.). A service class may also be a designation of privileges afforded members of a class such as full time students, executive staff, research staff, department members, preferred customers, customers paying surcharges for better service, etc.

While the foregoing uses the source identification code to perform classification, some embodiments may employ an optional feature wherein the destination code is examined to classify the packet and determine the quality of service. Preferably, this examination of the destination code will only be performed when a service code in the packet (e.g., the Type of Service field of FIG. 3) signifies a request for such a classification service. For example, an ISP may have already established a relationship with a destination that has agreed to pay for a higher quality of service for visitors to a designated site. Such a free, high-speed connection may be considered comparable to a toll-free telephone call made to an "800" number.

The edge router 24 can be periodically updated to reflect these special relationships with certain destinations. The routing table and lookup tables in the edge router 24 can be periodically updated for this purpose. In some embodiments an ISP will only perform classification for destinations with which the ISP has a relationship. In such cases, the edge router 24 will not examine the source identification code to perform packet classification (although it is expected that most embodiments will prefer to do source classification, as a minimum).

It will be appreciated that various modifications may be implemented with respect to the above described, preferred embodiments. The above described communications can be sent wirelessly, or over wire, cable, or fiber, or by microwave, or other links. Also, the present invention can be practiced with any of the protocols identified in FIG. 1, but is not limited to such protocols. While the illustrated system showed a single router for allowing a user access to a backbone, in other embodiments a user may have access through a number of alternative routers managed by one or more entities in order to gain access to a backbone.

Obviously, many modifications and variations of the present invention are possible in light of the above teachings. It is therefore to be understood that within the scope of the appended claims, the invention may be practiced otherwise than as specifically described.

What is claimed is:

1. A method for directing packets from a first network to a second network, packets of said first network following a predetermined protocol employing global addressing, packets of said first network having a source identification code, a destination code, and a service code, said second network offering the benefit of one of a plurality of service classes, the method comprising the steps of:

extracting the source identification code and the service code from packets of the first network;

using the source identification code to lookup a corresponding code indicating permission with respect to the service classes; and issuing packets onto the second network with the benefit of a permissible one of the service classes, the permissible one of the service classes being allocated consistent with the service code if the service code is consistent with the corresponding code.

2. Method in accordance with claim 1 employing a host and comprising the step of:

using the host to originate at least some of the packets and to set the source identification code, the destination code, and the service code for the packets produced by the host; and sending the packets from the host on at least one hop based on the destination code.

3. Method in accordance with claim 2 wherein packets produced by the host are produced by software giving a user the ability to select the service code.

4. Method in accordance with claim 2 wherein packets produced by the host are produced by software without the intervention of hardware dedicated to setting the service code.

5. Method in accordance with claim 2 wherein packets sent from the host make a plurality of hops with only once having the step performed of using the source identification code to lookup a corresponding code.

6. Method in accordance with claim 2 wherein packets sent from the host make a plurality of hops and arrive at a destination with only once having the step performed of using the source identification code to lookup a corresponding code.

7. Method in accordance with claim 2 wherein packets sent from the host make a plurality of hops before the step of using the source identification code to lookup a corresponding code.

8. Method in accordance with claim 1 employing an edge router for transferring packets to the second network, said second network being adapted to offer different types of quality of service, the step of issuing packets with the benefit of a permissible one of the service classes being performed at the edge router.

9. Method in accordance with claim 8 wherein the second network operates under one of the ATM, MPLS, IP TOS, and Diffserv standards.

10. Method in accordance with claim 1 comprising the steps of:
extracting the destination code from packets of the first network; and
using the destination code to lookup a corresponding code indicating permission with respect to the service classes.

11. Method in accordance with claim 10 wherein the step of using the destination code is conducted to establish a permission code independently of the source code.

12. Method in accordance with claim 10 wherein the step of using the destination code is conducted if the service code signifies the destination code is applicable.

13. Method in accordance with claim 1 employing a host and gateway, comprising the steps of:
using the host to originate at least some of the packets and to set the source identification code and the destination code;
using the gateway to set the service code for packets produced by the host; and
sending packets reaching the gateway from the host on at least one hop based on the destination code before the step of using the source identification code to lookup a corresponding code.

14. Method in accordance with claim 13 wherein the step of using the gateway to set the service code is performed by examining one or more of the destination code, the source code, or information carried by the packet indicating the type of data in the packet.

15. Method in accordance with claim 1 wherein the step of issuing packets with the benefit of a permissible one of the service classes is performed by allocating a defaulting one of the service classes if the service code is inconsistent with the corresponding code.

16. Method in accordance with claim 1 wherein the source identification code, the destination code, and the service code are located in a header defined by the predetermined protocol, said predetermined protocol operating at a network layer.

17. Method in accordance with claim 16 wherein the step of issuing packets with the benefit of a permissible one of the service classes is performed without reference to a layer above the network layer.

18. Method in accordance with claim 1 wherein the source identification code is one of a plurality of source identification codes, and wherein the corresponding code is one of a plurality of corresponding codes, the method comprising the steps of:
correlating the source identification codes with the corresponding codes and storing this correlation as entries in a service table, the step of issuing packets with the benefit of a permissible one of the service classes being performed by looking up the corresponding code in the service table by using the source identification code.

19. Method in accordance with claim 18 wherein some of the entries in the service table are indexed by a prefix of the source identification code in order to indicate that all codes having the prefix have the same correlation to the corresponding codes.

20. Method in accordance with claim 19 wherein the step of issuing packets with the benefit of a permissible one of the service classes is performed by looking up the corresponding code in the service table by referring to the longest one of the prefixes that matches the source identification code.

21. Method in accordance with claim 19 employing an application specific integrated circuit for performing lookups on the service table, the step of issuing packets with the benefit of a permissible one of the service classes being performed by looking up the corresponding code in the service table by referring to the longest one of the prefixes that matches the source identification code.

22. Method in accordance with claim 18 wherein each of the permission codes signify one or more of the service classes, so that authorization may be given for an individual one of the source identification codes to operate on one or another of the service classes.

23. Method in accordance with claim 1 wherein the predetermined protocol is the Internet Protocol and the service code is stored in a header in the Type of Service field.

24. Method in accordance with claim 1 wherein the predetermined protocol is the Internet Protocol and the service code is stored in a header in the IP Options field.

25. Method in accordance with claim 1 wherein the service code is encoded to signify a requested quality of service with respect to one or more of bandwidth, latency, jitter, reliability, and security.

26. Method in accordance with claim 1 wherein the service code is encoded to signify membership in a group entitled to a predetermined quality of service.

27. Method in accordance with claim 1 wherein the service code is encoded to signify a user application requiring a corresponding quality of service.

28. Method in accordance with claim 1 wherein the second network is a backbone, the service code being encoded to signify a request to enter the backbone.

29. Method in accordance with claim 28 wherein the service code includes information on a requested channel within the backbone.

30. Method in accordance with claim 1 employing a plurality of access nodes of one or more backbones, the service code being interpreted to signify a selection of one of the access nodes.

31. Method in accordance with claim 1 comprising the step of:
calculating a usage charge by measuring the amount of usage of the step of issuing packets with the benefit of a permissible one of the service classes.

32. Apparatus for directing packets from a first network to a second network, packets of said first network following a predetermined protocol employing global addressing, packets of said first network having a source identification code, a destination code, and a service code, said second network offering the benefit of one of a plurality of service classes, the apparatus comprising:
an input device adapted to be coupled to said first network for extracting from packets the source identification code and the service code;
a table coupled to said input device for using the source identification code to lookup a corresponding code indicating permission with respect to the service classes, a permissible one of the service classes being allocated consistent with the service code if the service code is consistent with the corresponding code; and
an output device adapted to be coupled to said second network, said output device being in communication with said input device for issuing packets with the benefit of the permissible one of the service classes.

33. Apparatus in accordance with claim 32 wherein the output device is at the edge of the second network, said second network being adapted to offer different types of quality of service, the output device being operable to route packets to the second network with the benefit of one of the service classes.

34. Apparatus in accordance with claim 33 wherein the output device produces an output under one of the ATM, MPLS, Diffserv, and IP TOS, standards.

35. Apparatus in accordance with claim 32 wherein the output device issues packets with the benefit of a defaulting one of the service classes if the service code is inconsistent with the corresponding code.

36. Apparatus in accordance with claim 32 wherein the source identification code, the destination code, and the service code are located in a header defined by the predetermined protocol, said predetermined protocol operating at a network layer, the apparatus being operable to allocate service classes by obtaining information from the network layer.

37. Apparatus in accordance with claim 36 wherein the apparatus is operable to issue packets from the output device without reference to a layer above the network layer.

38. Apparatus in accordance with claim 32 wherein the source identification code is one of a plurality of source identification codes, and wherein the corresponding code is one of a plurality of corresponding codes, the apparatus comprising:
a service table, the apparatus being operable to (a) correlate the source identification codes with the corresponding codes and store this correlation as entries in the service table, and (b) lookup the corresponding code in the service table by using the source identification code.

39. Apparatus in accordance with claim 38 wherein some of the entries in the service table are indexed by a prefix of the source identification code in order to indicate that all codes having the prefix have the same correlation to the corresponding codes.

40. Apparatus in accordance with claim 39 and operable to lookup the corresponding code in the service table by referring to the longest one of the prefixes that matches the source identification code.

41. Apparatus in accordance with claim 39 comprising:
an application specific integrated circuit for looking up the corresponding code in the service table by referring to the longest one of the prefixes that matches the source identification code.

42. Apparatus in accordance with claim 38 wherein each of the corresponding codes signify one or more of the service classes, so that authorization may be given for an individual one of the source identification codes to operate on one or another of the service classes.

43. Apparatus in accordance with claim 32 wherein the input device is operable with the predetermined protocol being the Internet Protocol and with the service code being stored in a header in the Type of Service field.

44. Apparatus in accordance with claim 32 wherein the input device is operable with the predetermined protocol being the Internet Protocol and the service code being stored in a header in the IP Options field.

45. Apparatus in accordance with claim 32 wherein the apparatus is operable to respond to the service code by acting to arrange a predetermined quality of service with respect to one or more of bandwidth, latency, jitter, reliability, and security.

46. Apparatus in accordance with claim 32 wherein the service code may be encoded to signify membership in a group entitled to a predetermined quality of service, the apparatus being operable to arrange the predetermined quality of service in response to the service code being encoded to signify membership in the group.

47. Apparatus in accordance with claim 32 wherein the service code may be encoded to signify a user application requiring a corresponding quality of service, the apparatus being operable to arrange the corresponding quality of service in response to the service code being encoded to signify the user application.

48. Apparatus in accordance with claim 29 wherein said second network is a backbone, the apparatus being operable to arrange for entry to the backbone in response to the service code being encoded to signify a request to enter the backbone.

49. Apparatus in accordance with claim 48 wherein the apparatus is operable to arrange for entry on a selected channel of the backbone in response to the service code being encoded to signify a request for the selected channel within the backbone.

50. Apparatus in accordance with claim 32 and adapted to couple to a plurality of access nodes of one or more backbones, the apparatus being operable to arrange for entry at a selected one of the access nodes of one of the backbones in response to the service code being encoded to signify a request for the selected one of the access nodes.

51. Apparatus in accordance with claim 32 comprising:
means for calculating a usage charge by measuring the amount of usage under the source identification code.

52. Apparatus in accordance with claim 32 wherein the input device has a plurality of input ports and wherein the output device has a plurality of output ports, the apparatus comprising:
a switching fabric coupled between said input device and said output device for directing packets from selected ones of said input ports to selected ones of said output ports; and
a processor coupled to said input device and said output device for updating a routing table indicating how packets are to be routed between the input ports and the output ports.

53. Apparatus for directing packets from a first network to a second network, packets of said first network following a predetermined protocol employing global addressing, packets of said first network having a source identification code, a destination code, and a service code, said second network offering the benefit of one of a plurality of service classes, the apparatus comprising:
a host for (a) originating at least some of the packets and setting the source identification code, the destination code, and the service code for the packets, and (b) sending the packets from the host on at least one hop over the first network consistent with the destination code; and
an edge router for receiving packets over the first network from the host and for transferring the packets to the second network using different ones of service classes, the edge router comprising:
an input device adapted to be connected to the first network for extracting from packets the source identification code and the service code;
a table coupled to said input device for using the source identification code to lookup a corresponding code indicating permission with respect to the service classes, a permissible one of the service classes being allocated consistent with the service code if the service code is consistent with the corresponding code; and
an output device adapted to be connected to the second network, said output device being in communication with said input device for sending packets onto the second network with the benefit of the permissible one of the service classes.

54. Apparatus in accordance with claim 53 wherein packets produced by the host are produced by software giving a user the ability to select the service code.

55. Apparatus in accordance with claim 53 wherein packets produced by the host are produced by software without the intervention of hardware dedicated to setting the service code.

56. Apparatus for directing packets from a first network to a second network, packets of said first network following a predetermined protocol employing global addressing, packets of said first network having a source identification code, a destination code, and a service code, said second network offering the benefit of one of a plurality of service classes, the apparatus comprising:

a host for (a) originating at least some of the packets and setting the source identification code and the destination code for the packets, and (b) sending the packets from the host on at least one hop over the first network consistent with the destination code; and a gateway coupled to the host over the first network for (a) setting the service code for the packets produced by the host, and (b) sending the packets reaching the gateway from the host on at least one hop over the first network consistent with the destination code; and an edge router coupled to said gateway over said first network for transferring packets to the second network, the edge router comprising:

an input device adapted to be coupled to said first network for extracting from packets the source identification code and the service code;

a table coupled to said input device for using the source identification code to lookup a corresponding code indicating permission with respect to the service classes, a permissible one of the service classes being allocated consistent with the service code if the service code is consistent with the corresponding code; and an output device adapted to be coupled to said second network, said output device being in communication with said input device for issuing packets with the benefit of the permissible one of the service classes.

57. Apparatus in accordance with claim 56 wherein the gateway is operable to examine one or more of the destination code, the source code, or information carried by the packets indicating the type of data in the packet.

58. Apparatus for directing from a first network packets following a predetermined protocol employing global addressing, packets of said first network having a source identification code, a destination code, and a service code, the apparatus comprising:

a second network offering the benefit of one or more service classes;

an edge router for transferring packets to the second network using different ones of the service classes, the edge router comprising:

an input device adapted to be connected to the first network for extracting from packets the source identification code and the service code;

a table coupled to said input device for using the source identification code to lookup a corresponding code indicating permission with respect to the service classes, a permissible one of the service classes being allocated consistent with the service code if the service code is consistent with the corresponding code; and an output device adapted to be connected to the second network, said output device being in communication with said input device for sending packets onto the second network with the benefit of the permissible one of the service classes.

59. A method for directing packets from a first network to a second network, packets of said first network following a predetermined protocol employing global addressing, packets of said first network having a source identification code, a destination code, and a service code, said second network offering the benefit of one of a plurality of service classes, the method comprising the steps of:

extracting the destination code and the service code from packets of the first network;

using the destination code to lookup a corresponding code indicating permission with respect to the service classes; and issuing packets onto the second network with the benefit of a permissible one of the service classes, the permissible one of the service classes being allocated consistent with the service code if the service code is consistent with the corresponding code.

60. Method in accordance with claim 59 wherein the step of using the destination code is conducted to establish a permission code independently of the source code.

61. Method in accordance with claim 59 wherein the step of using the destination code is conducted if the service code signifies the destination code is applicable.

* * * * *